US012012891B1

(12) United States Patent
Speer et al.

(10) Patent No.: US 12,012,891 B1
(45) Date of Patent: Jun. 18, 2024

(54) AIRCRAFT TURBOPROP ENGINE INLET COMPACT PROFILE CONFIGURATION TO IMPROVE AIR INTAKE EFFICIENCY AND WITHOUT LOSS OF ANTI-ICING ABILITY

(71) Applicant: American Aviation, Inc., Hayden, ID (US)

(72) Inventors: Stephen R. Speer, Coeur d'Alene, ID (US); Alexlander J. Duncan, Coeur d'Alene, ID (US); Jayme S. Bartlett, Deer Park, WA (US); George R. Kemner, Harrison, ID (US)

(73) Assignee: AMERICAN AVIATION, Inc, Hayden, ID (US)

( * ) Notice: Subject to any disclaimer, the term of this patent is extended or adjusted under 35 U.S.C. 154(b) by 0 days.

(21) Appl. No.: 17/746,747

(22) Filed: May 17, 2022

Related U.S. Application Data

(62) Division of application No. 17/076,798, filed on Oct. 21, 2020.

(60) Provisional application No. 62/923,968, filed on Oct. 21, 2019.

(51) Int. Cl.
  *F02C 7/047* (2006.01)
  *B64D 33/02* (2006.01)

(52) U.S. Cl.
  CPC ...... *F02C 7/047* (2013.01); *B64D 2033/0233* (2013.01)

(58) Field of Classification Search
  CPC .................. F02C 7/047; B64D 2033/0233
  See application file for complete search history.

(56) References Cited

U.S. PATENT DOCUMENTS

| | | | | |
|---|---|---|---|---|
| 2,668,596 A * | 2/1954 | Elliott | ..................... | B64D 15/04 |
| | | | | 416/129 |
| 4,240,250 A * | 12/1980 | Harris | ..................... | F02C 7/045 |
| | | | | 60/39.093 |
| 7,823,374 B2 * | 11/2010 | Venkataramani | ......... | F02C 7/14 |
| | | | | 60/39.83 |
| 7,900,872 B2 * | 3/2011 | Sternberger | ........... | B64D 33/02 |
| | | | | 60/39.093 |

(Continued)

*Primary Examiner* — Lorne E Meade
(74) *Attorney, Agent, or Firm* — Barry G. Magidoff; Anthony R. Barkume

(57) ABSTRACT

A turboprop powered aircraft having a cowling or nacelle surrounding the engine, said cowling incorporates an air inlet and internal ducting to the engine wherein the inlet incorporated anti icing ducts, said inlet shape has a closed oval or other non-circular shape that is not coaxial to the engine propeller drive shaft. Inlet anti-icing heating duct means are provided for channeling a portion of the engines exhaust to the interior of the inlet rim. A further improvement in inlet efficiency can be achieved by reducing the thickness of the inlet cross-section, but this results in less space available for the hot exhaust connections. To provide for the inlet reduced section thickness, the exhaust flow connections also incorporate reduced thickness sections to facilitate cooling and insulation of the adjacent cowling and inlet duct surfaces from the excessive heat associated with the hot exhaust gas connection. Additional cooling means utilize air flow from openings in the engine cowling that are channeled to cool internal surfaces of the cowling that may be exposed to excessive heat.

11 Claims, 18 Drawing Sheets

(56) References Cited

U.S. PATENT DOCUMENTS

| | | | |
|---|---|---|---|
| 9,759,088 B2* | 9/2017 | Belmonte | ............... F01D 25/02 |
| 2018/0363588 A1* | 12/2018 | Iglewski | ................ B64D 33/04 |

* cited by examiner

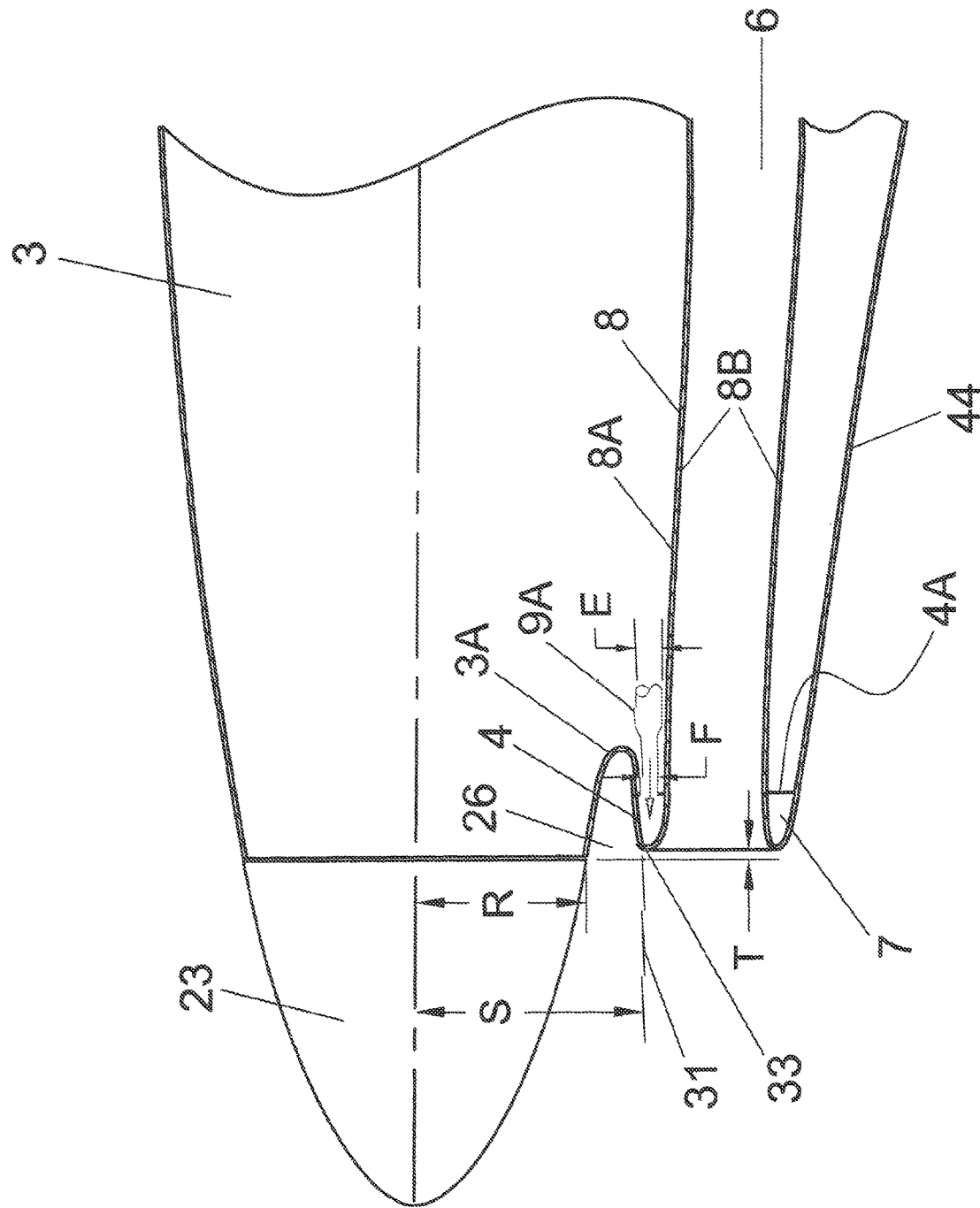

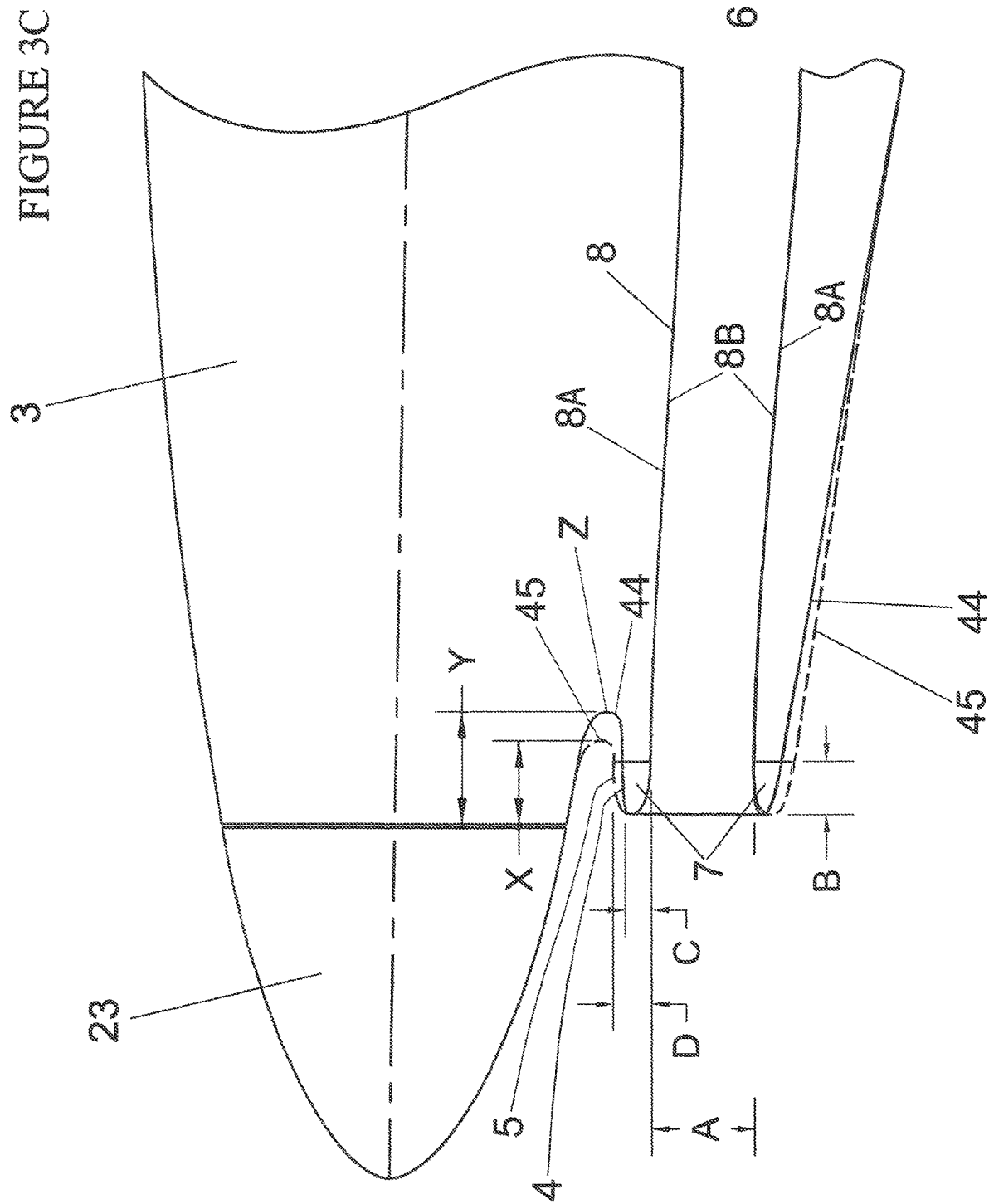

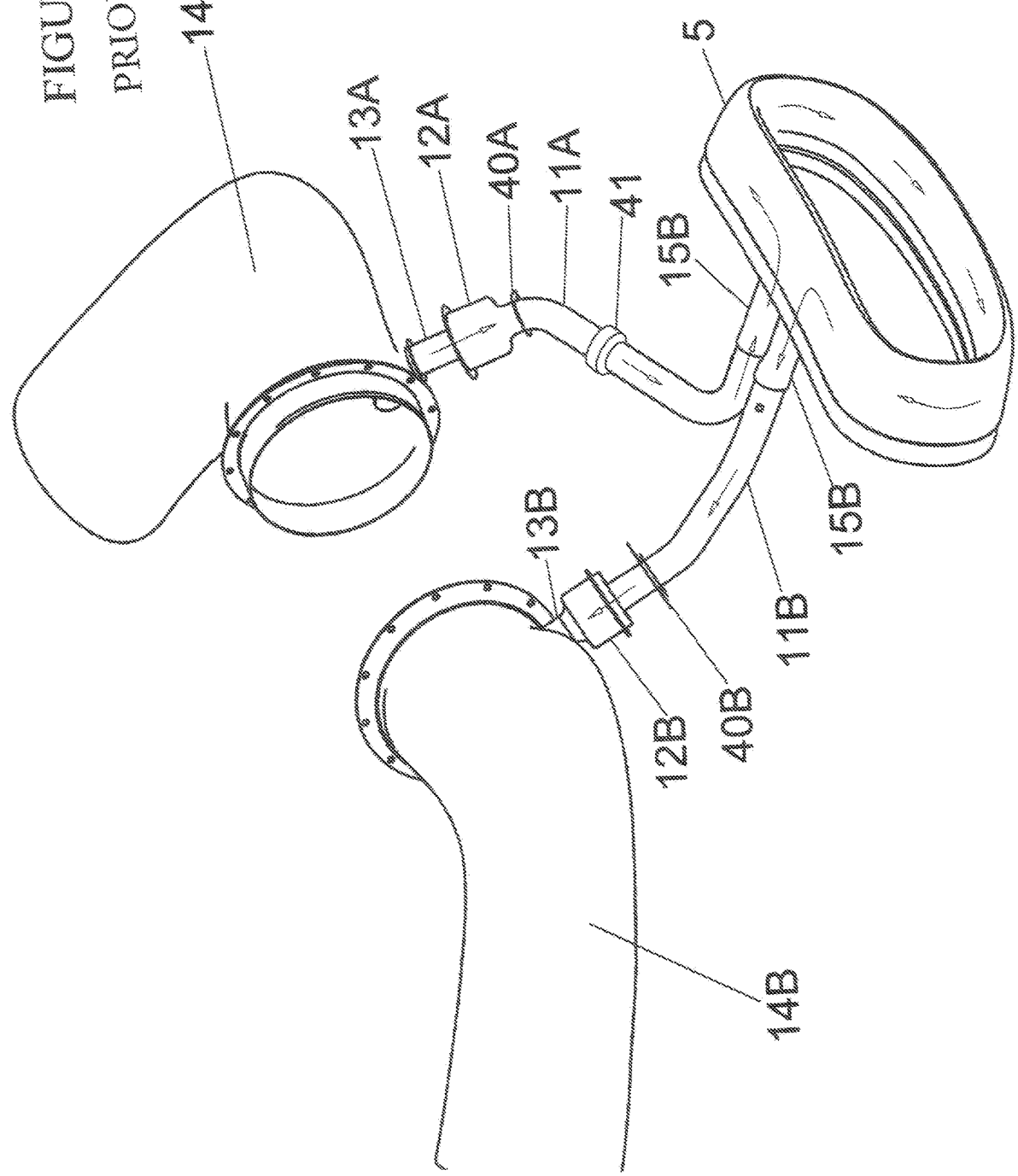

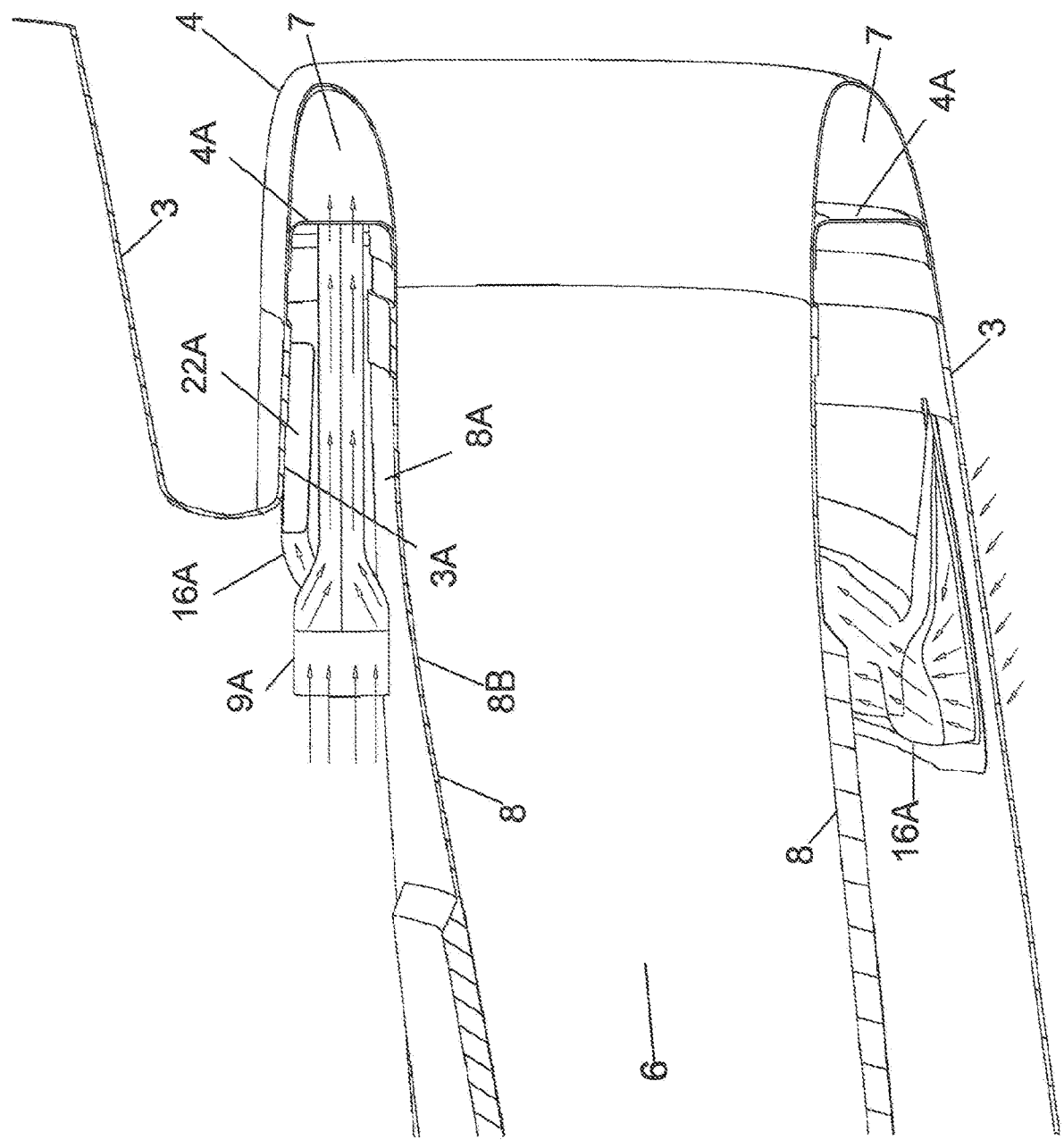

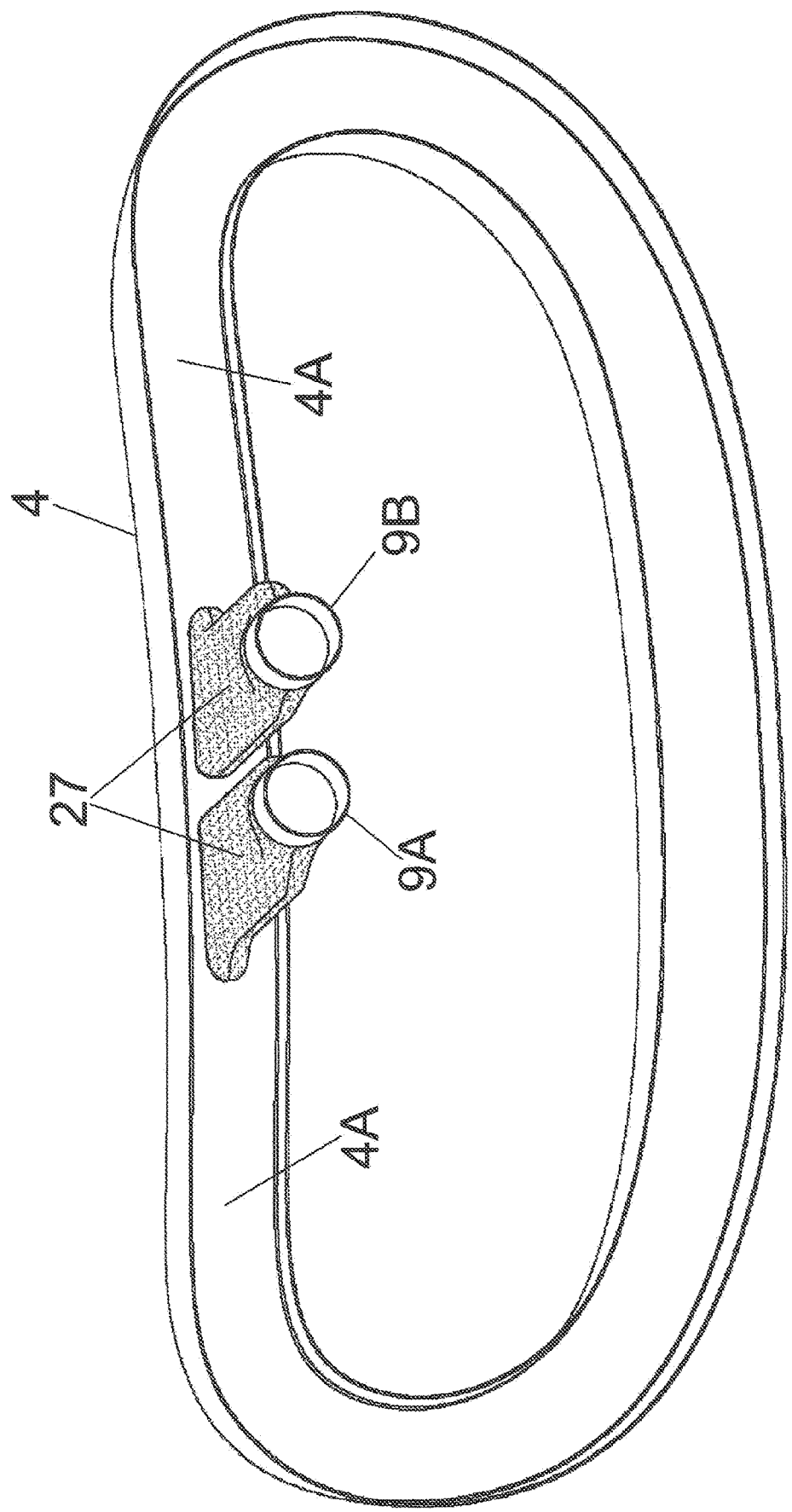

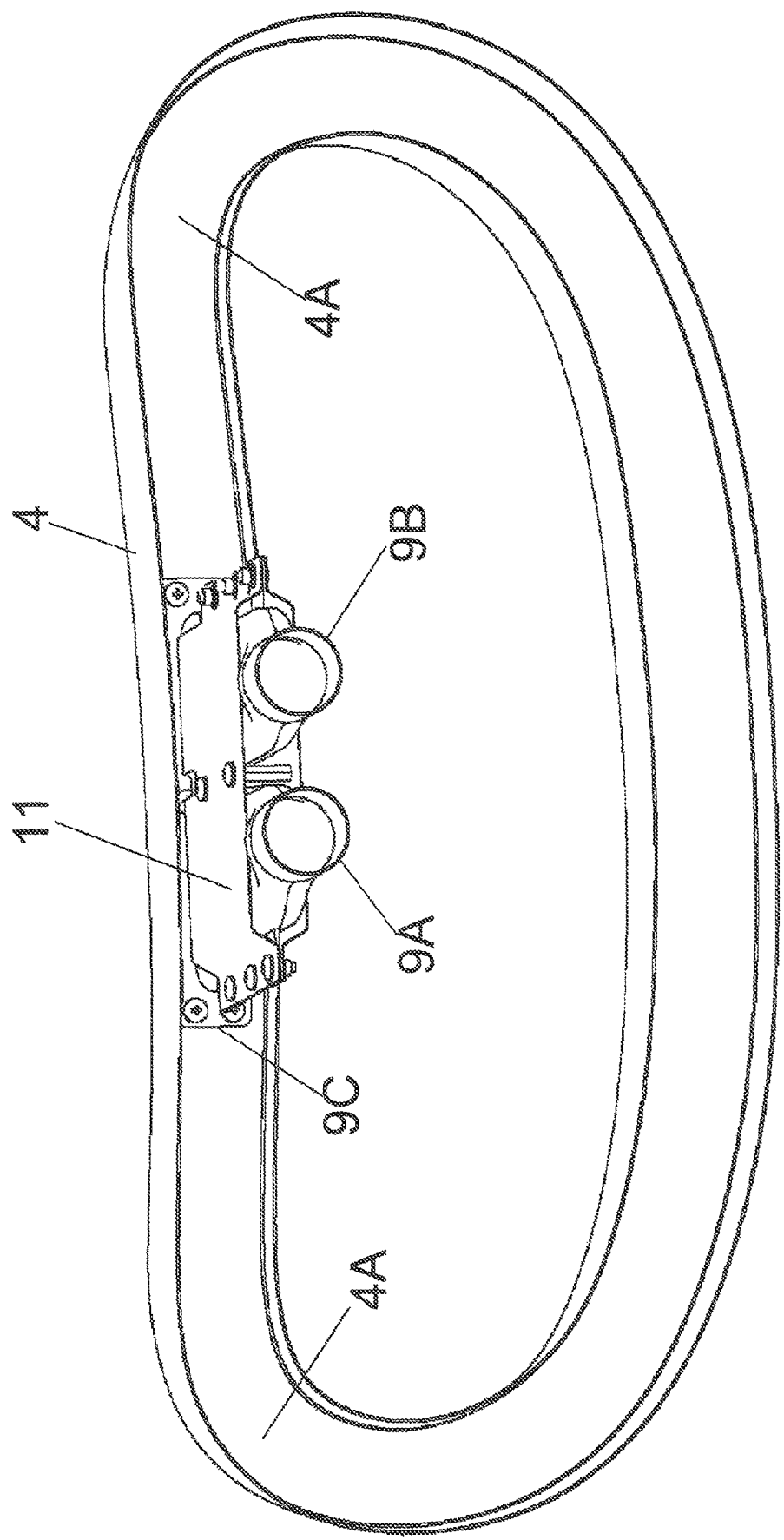

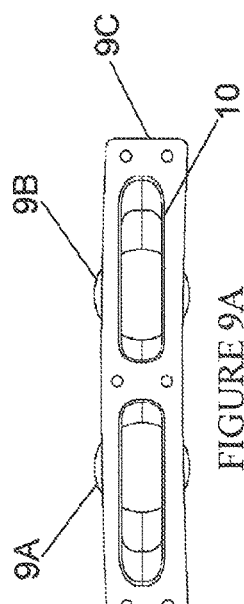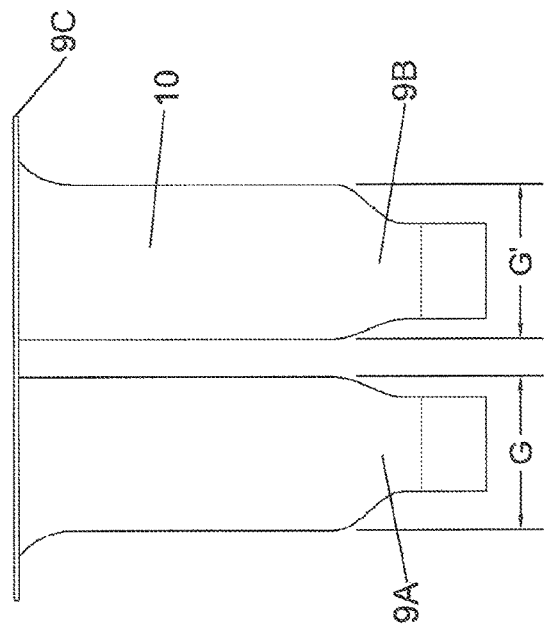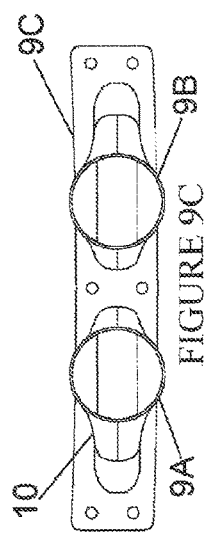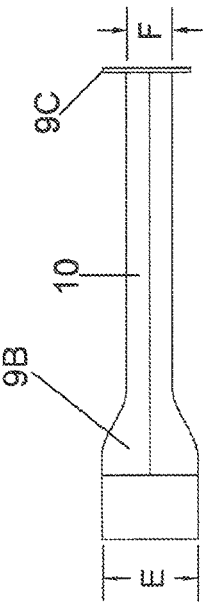

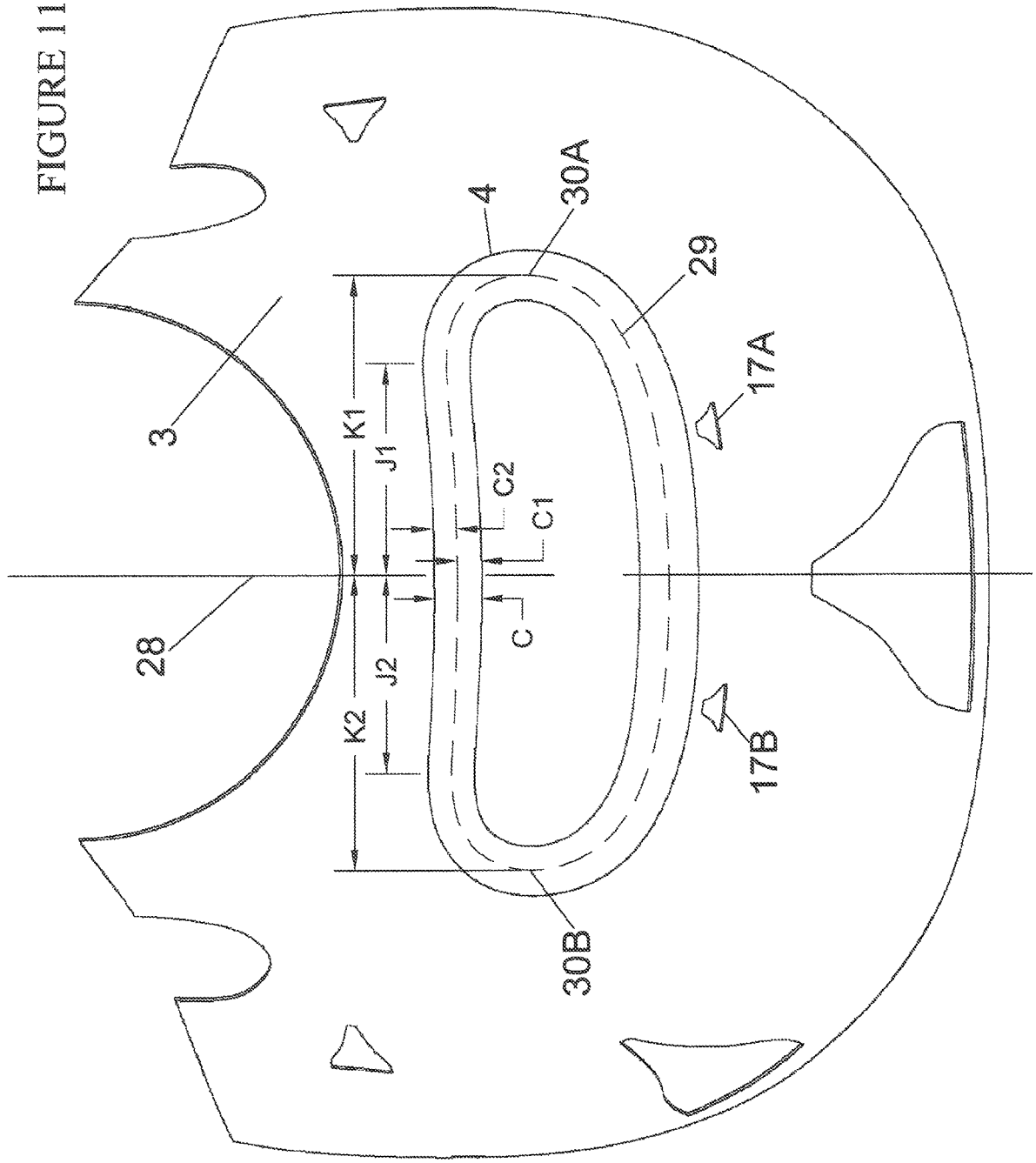

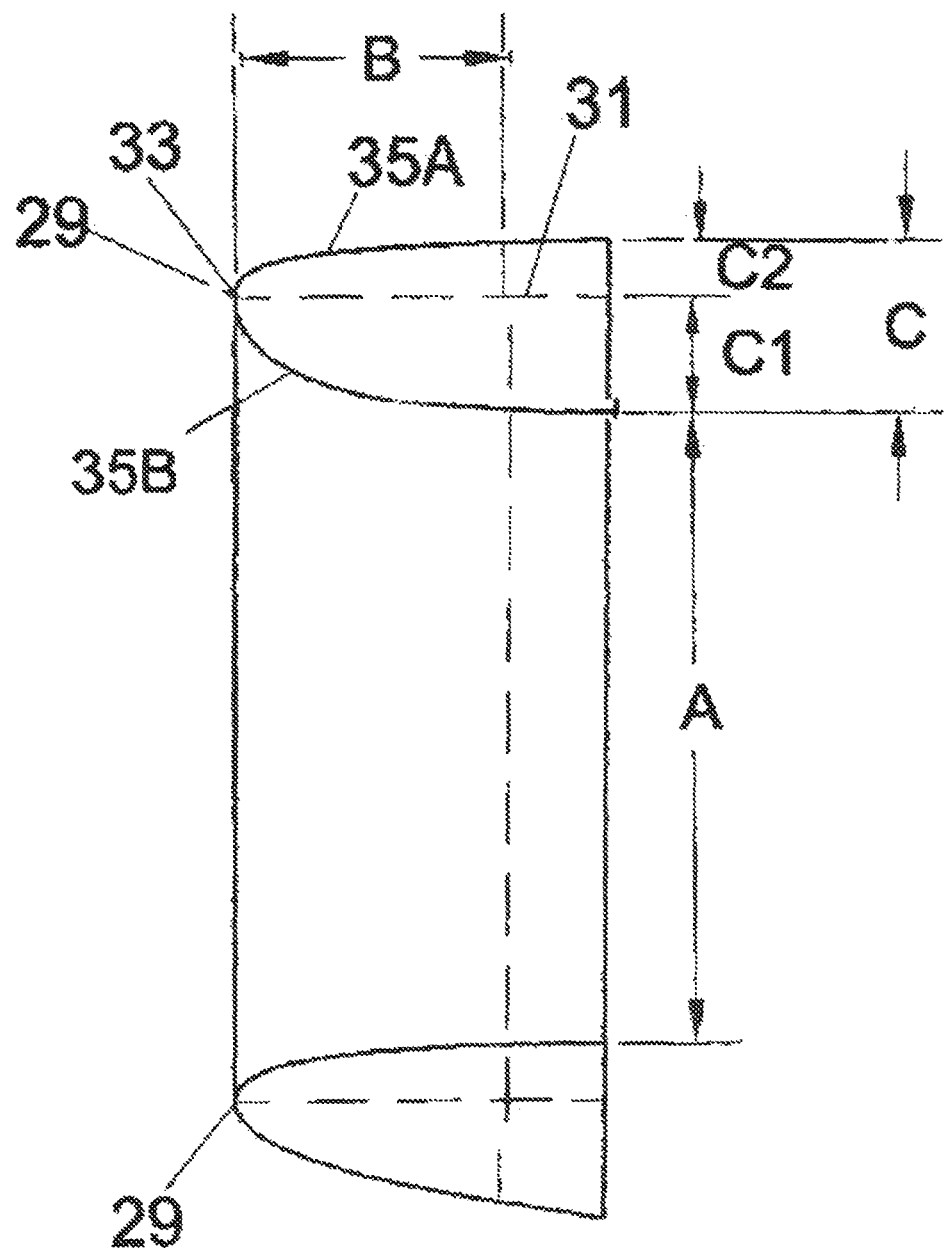

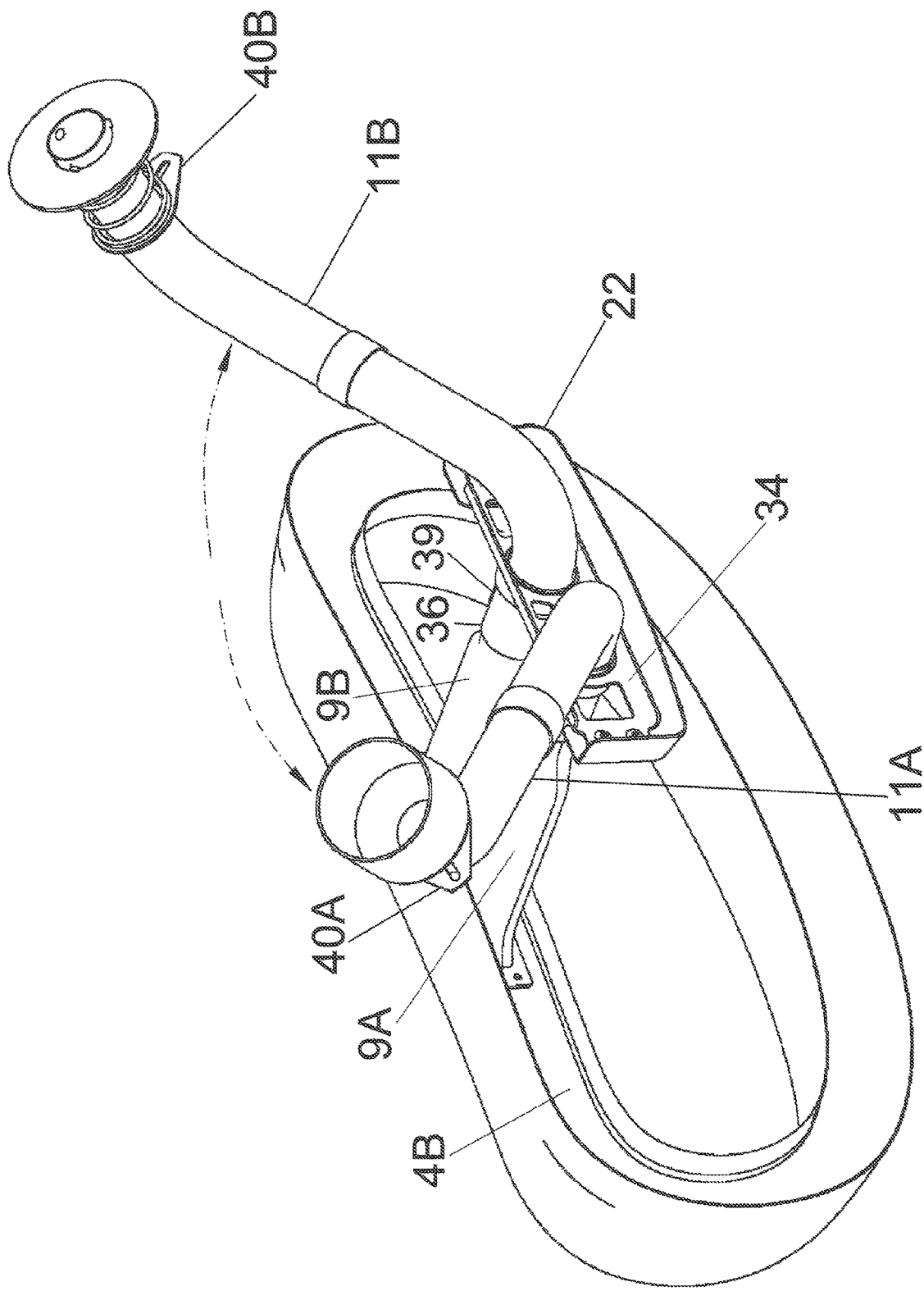

AIRCRAFT TURBOPROP ENGINE INLET COMPACT PROFILE CONFIGURATION TO IMPROVE AIR INTAKE EFFICIENCY AND WITHOUT LOSS OF ANTI-ICING ABILITY

This application claims the benefit of priority pursuant to 35 U.S.C. 119(e) from a U.S. Provisional Patent Application having Application No. 62/923.968 filed Oct. 21, 2019, and a non-Provisional U.S. patent application, having application Ser. No. 17/076,798, filed Oct. 21, 2020, the texts of which are each fully incorporated by reference herein, as if repeated, below.

BACKGROUND OF THE INVENTION

The design of the engine intake air inlet for a turboprop powered aircraft has a significant effect on the power output of the engine, particularly at higher altitudes. This is because a large portion of the power generated by a turboprop engine is consumed by the engine's compressor section. Improvements in the design of the air inlet and associated ducting that increase the ram-air recovery to the engine intake, can result in higher compressor efficiency.

A conventional, less efficient inlet design of prior art is shown in FIG. 1. In this design the upper surface of the air inlet is an extension of the cowling surface and is approximately in-line with the propeller spinner's outer surface. It was thought that this approach would have minimal drag, but the turbulent air surrounding the spinner greatly reduces the pressure recovery characteristic of the inlet.

Another prior art approach has been to use a flush inlet similar to the designs outlined in NACA Report ACR No. 5120 The flush inlet designs have an advantage that they generally do not require separate means to deice the inlet, but the turbulent air surrounding the spinner also greatly reduces the pressure recovery characteristic of the inlet.

A significant improvement in the inlet ram-air pressure recovery associated with prior art designs is shown in FIG. 3A. In this design the inlet opening has been moved so that all or most of the turbulent air exiting the spinner does not enter the inlet. The offset opening location generally incorporates a cavity recess region in the cowling aft of the spinner and above the inlet that provides an alternate flow path for the turbulent boundary layer air exiting the spinner. The design shown in FIG. 3A is commonly referred to as a Pitot Cowling, or Ram-Air Cowling.

Prior art has recognized the importance of incorporating means to prevent ice from forming on the inlet surfaces. It is also critical to insure adequate air flow to the engine is maintained when the aircraft is operated in icing conditions The means to prevent ice from forming or removing ice once formed, are typically referred to as anti-ice or de-ice systems. These systems generally involve heating the inlet surfaces. Sources of heat include siphoning off a portion of pressurization bleed air or engine exhaust. Electrical heating elements have been used extensively. Alternatively, some systems employ ice melting fluids that are continuously applied to the outer surfaces of the inlet when the aircraft is operated in icing conditions.

SUMMARY OF THE INVENTION

Although the basic design of a typical Ram-Air Cowling is well understood, this invention adds several unique design details that when incorporated individually or in combination result in an improvement in the operation of the inlet. For improved ram air recovery to the engine, the inlet cross-sectional thickness is reduced. Where the inlet anti-icing means are provided by extracting a portion of the engine's exhaust gases or compressor bleed air, additional means are provided to cool the cowling and inlet duct surfaces that may be exposed to excessive heat associated with the inlet exhaust gas connection means. To accomplish this, external air flow from separate openings in the engine cowling is channeled through ducting to specific regions of the internal surfaces of the cowling and the external surfaces of the engine air intake ducting that may be exposed to heat from the exhaust gases entering or exiting the inlet. This surface cooling is particularly important for cowlings and ducting made of composite materials, such as epoxy pre-impregnated carbon fibers.

In current practice, round tubes are connected directly to the inlet to channel the hot gasses to and from the inlet lip. However, using thinner inlet sections of the preferred lip design described herein results in less space for the exhaust flow connections. Consequently, when using thinner inlet sections of the preferred lip design with round tubes directly connected to the inlet lip, the diameter of the round tubes would need to be significantly reduced, and the round tubes may not have sufficient cross-sectional area to insure adequate hot gas flow without interfering with the cowling and inlet duct surfaces. To provide the needed flow area according to the invention, connection adaptors are used that transition from a round tube section to a non round section at the attachment location on the inlet wherein sufficient flow area is maintained.

The invention transition connection profile is designed to reduce heating of the adjacent internal surfaces of the cowling as well as the external surfaces of the engine airflow inlet duct.

The design of the transition connection invention also provides a channel for external air to be ducted to cool the cowling and duct surfaces. The invention also describes means to channel air flow to cool surfaces near the transition connection.

BRIEF DESCRIPTION OF THE DRAWINGS

FIG. 3B is a vertical plane view through the engine centerline showing a typical cross-section of the reduced section thickness ram-air inlet design according to the invention.

FIG. 3C is a vertical plane view showing an overlay comparison of the sections shown in FIGS. 3A and 3B.

FIG. 4 is a perspective view of the prior art round tube exhaust heating connections to the air inlet typical of designs currently used on turboprop powered aircraft.

FIG. 6 is a side cross-sectional perspective view of a cut-away of the cowling in FIG. 2 showing details of the connections and components for the ram-air inlet design according to the invention.

FIG. 7 is an aft perspective view of the circular to flattened or oval, transition connection to the inlet for this invention.

FIG. 8 is an aft perspective view of the circular to flattened, or ovoid, transition connection to the inlet lip, or rim, described for this invention, with an attached heat shield.

FIG. 9A is a front view of the circular to flattened, or ovoid, transition connection described in this invention.

FIG. 9B is a top view of the circular to flattened, or ovoid, transition connection described in this invention.

FIG. 9C is an aft view of the circular to flattened, or ovoid, transition connection described in this invention.

FIG. 9D is a side view of the circular to flattened, or ovoid, transition connection described in this invention.

FIG. 11A is a front view of the cowling in FIG. 2 showing some of the dimension references and the NACA inlets supplying air to the internal cooling air ducting shown in FIG. 10.

FIG. 11B is vertical plane view through the engine centerline showing a typical cross-section, taken along lines C1-C2 of FIG. 11a, of the reduced section thickness ram-air inlet design according to the invention

FIG. 14B is an aft perspective view of the exhaust tube connections and support of FIG. 14A assembled.

PRIOR ART DISCUSSION AND COMPARISON

Figure 1:
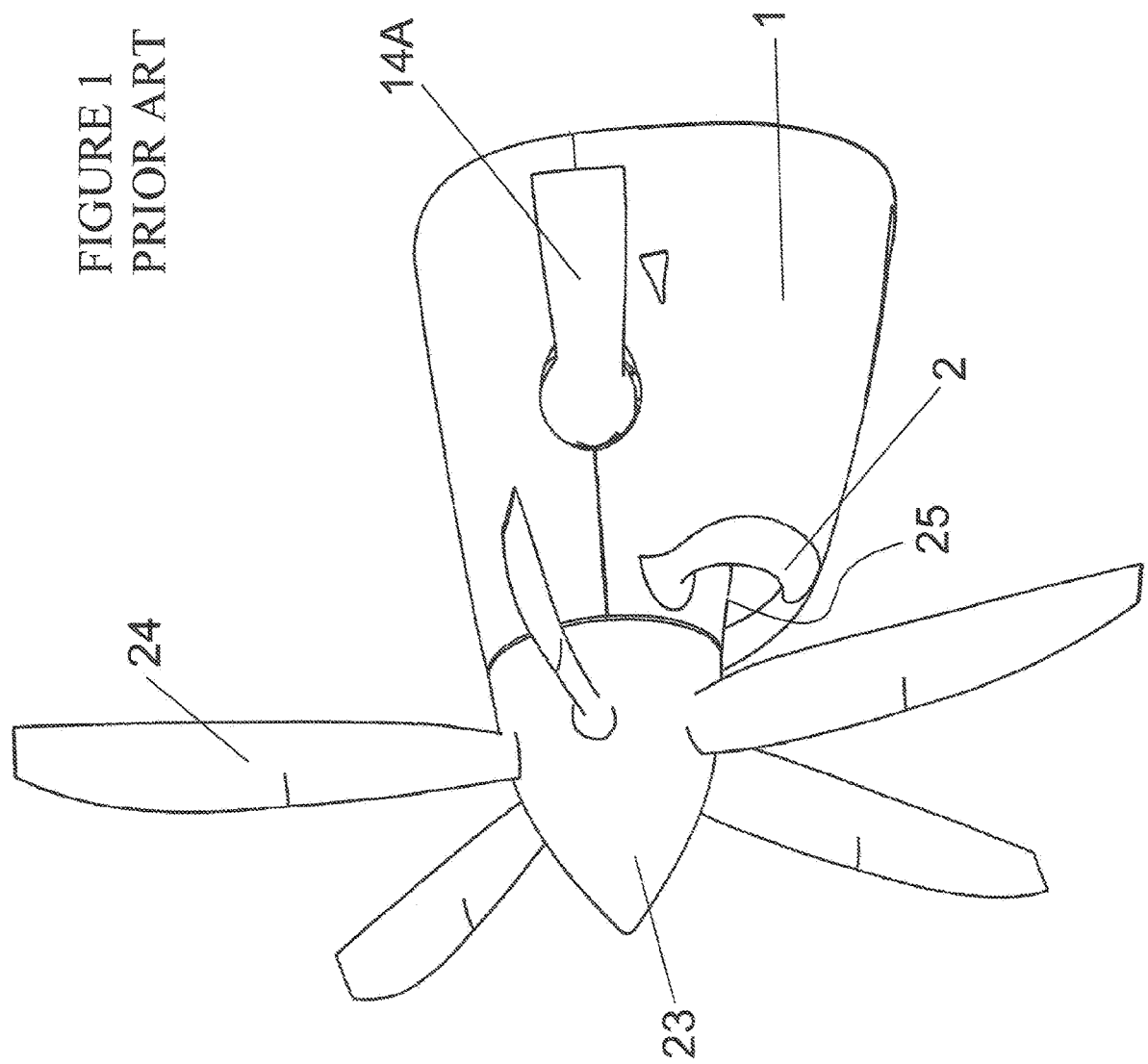
FIG. 1 is a perspective view of the prior art, non-ram-air design inlet used on the Pilatus® PC-12® and 21 model single engine turboprop as well as other aircraft.
Figure 3A:
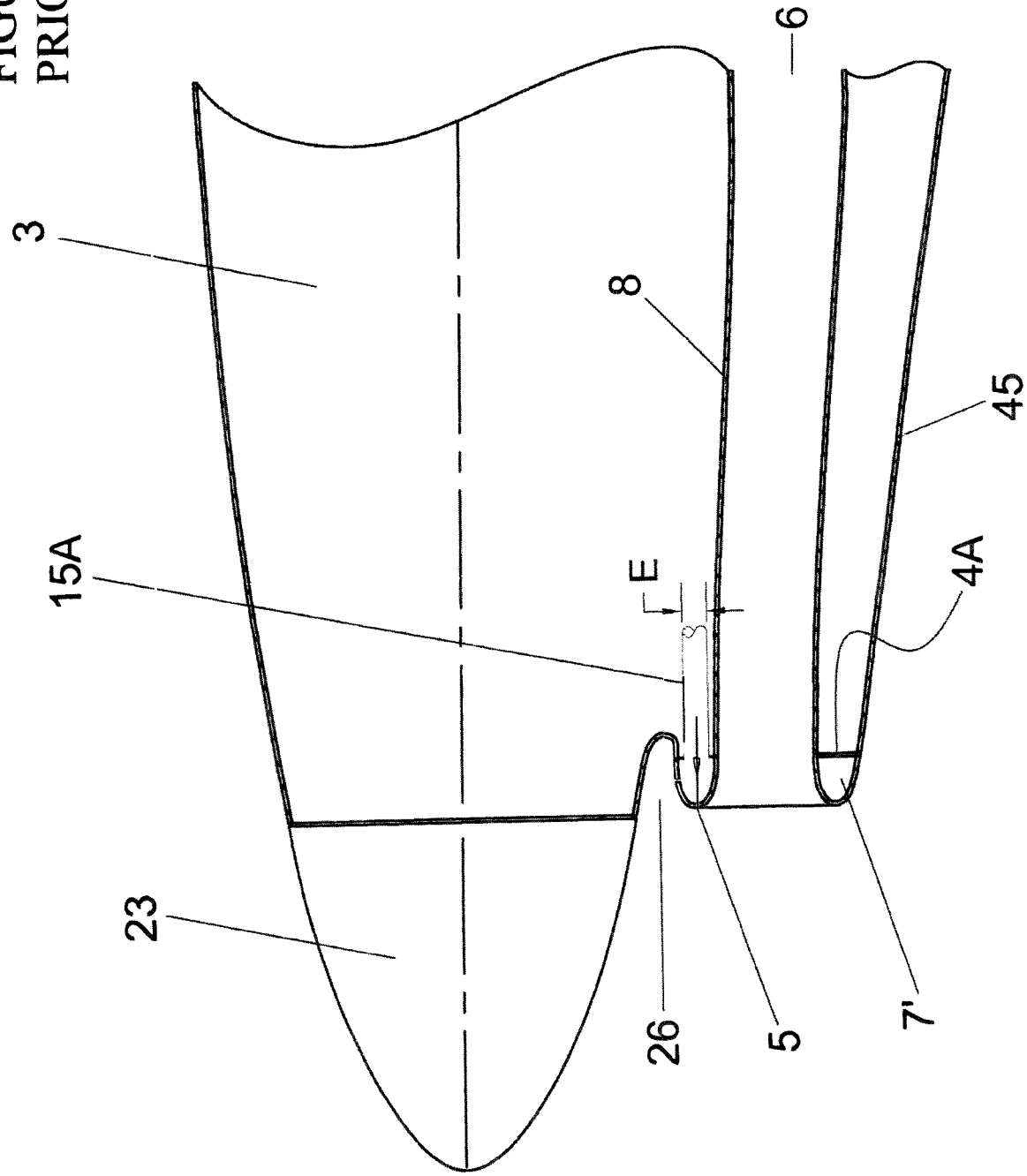
FIG. 3A is a vertical plane view through the engine centerline showing a typical cross-section of the prior art ram-air inlet designs currently used on turboprop powered aircraft.

The two basic prior art cowling configurations used on aircraft powered by turboprop engines are shown in FIGS. 1 and 3A. Referring to FIG. 1 for the first configuration, an aerodynamically contoured nacelle or cowling 1 surrounds the engine compartment with openings to accommodate the engine's exhaust stacks 14a An inlet 2 providing intake air to the engine is positioned behind the propeller 24. In most installations, the inlet 2 is not co-axial to the propeller centerline but is oriented either above or below the propeller spinner 23, with below generally being preferred. For the configuration shown in FIG. 1, the upper surface of the inlet air duct 25 to the engine is approximately tangent to the aft surface of the spinner, with the design goal of having the air flow uniformly and with minimal flow loss from the spinner into the inlet. As anti-icing provisions for the lip of the inlet are generally required by the operational specifications of most aircraft, the anti-icing provisions need only be applied to the lower, crescent portion of the inlet lip, or rim.

Figure 2:
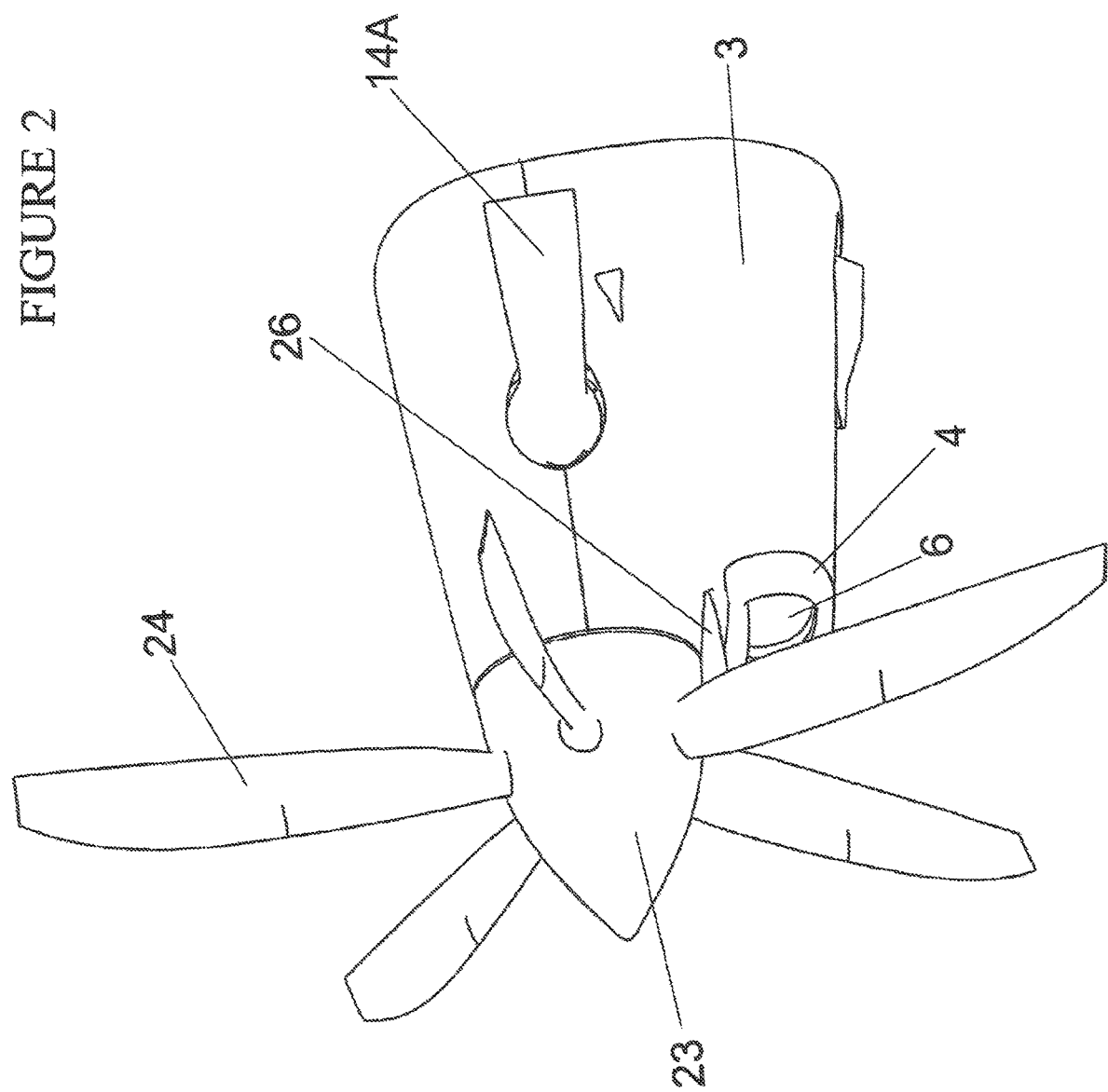
FIG. 2 is a perspective view of a ram-air inlet design suitable for turboprop powered aircraft including the Pilatus® PC-12® and 21 models, incorporating the design aspects of the invention.

The configuration shown in FIG. 3A represents what is commonly referred to as a ram-air cowling design. The ram-air cowling design is generally preferred over the configuration shown in FIG. 1 because the position of the inlet results in higher pressure recovery to the intake of the engine. Referring to FIG. 2, an aerodynamically contoured nacelle or cowling 3 having external surface 45, surrounds the engine compartment with openings to accommodate the engine's exhaust stacks 14a. An inlet 5 providing intake air to the engine is positioned just behind propeller 24 and generally below the propeller spinner 23. For the ram-air configuration the entrance to the inlet 5 is positioned a sufficient distance below or above the surface of the spinner 23 to provide a gap region 26 for air flow exiting the spinner 23 to not enter the inlet 5. This is because the airflow near the spinner 23 is more turbulent and has less potential dynamic pressure than air flow further out from the centerline of the propeller 24. To capture the higher velocity air exiting the propeller, the inlet is position close to the trailing edge of the propeller blades. Current FAA regulations require at least 0.5-inch clearance between the inlet lip and propeller blade trailing edges when the propeller blades are in the feather positions.

As anti-icing provisions for the lip of the inlet 5 are generally required by the operational specifications of most aircraft, the anti-icing provisions need to be applied to the entire lip region of the inlet 5.

FIG. 3A illustrates the internal arrangement of a typical ram-air cowling inlet design in the prior art. The engine's intake air enters the inlet 5 and flows through the internal passage 6 of duct 8 to the engine's intake plenum chamber. A common means to deice the inlet 5 is to siphon off a portion of the hot exhaust exiting the exhaust stack 14a, and channel the hot gas flow through the inlet 5. For this, round tubing 15a is used to connect the inlet 5 to the exhaust stack 14a. The diameter (reference E in FIGS. 3A and 3B) of the tube 15a must be large enough to insure the area of the tubing is of sufficient size to achieve an adequate flow rate through the interior channel 7 of the inlet 5 to fully deice the inlet 5 surfaces. In prior art designs this requires that the inlet cross-sectional thickness (reference D in FIG. 3C) in the region of the exhaust tube connection be larger than the diameter of the connection tube 15a. In prior art typical designs, the inlet 5 cross-sectional thickness D in the region of the connection will be over 2 times the tube diameter E to provide sufficient clearance to the adjacent surface of the cowling 3 and duct 8.

DETAILED DESCRIPTION

FIG. 3B illustrates the preferred internal connection arrangement provided in the present invention. The inlet centerline upper section leading edge point 33 is positioned at distance S from the engine centerline. The distance S is generally about 1.2 to 1.5 times the maximum radius, R, of the spinner, and preferably between 1.27 to 1.33 times the maximum radius of the spinner. The inlet centerline upper section leading edge point 33 is also positioned aft the spinner aft bulkhead (spinner & cowl junction) by distance T. As mentions the distance T must be sufficient to provide the FAA require minimum clearance with the propeller blades. For most installations the distance T is about between 0.5 and 1.1 inches but may be more if the blades have a larger aft sweep.

Referencing FIG. 3C, Item 45 refers to the outer surface of a prior art cowling. Item 44 refers to the outer surface of the cowling incorporating the invention concepts discussed herein, and Item 3a refers to the inner surface of the said cowling. Item 8 refers to the internal duct channeling the airflow to the engine, said duct having and external surface 8a, and internal surface 8b.

A contribution to an improvement in inlet efficiency was achieved by reducing the thickness of the inlet lip 4 cross-section (reference C in FIGS. 3C, 11A, and 11B). Referencing a vertical plane through the engine drive shaft centerline 28, in the preferred section geometry, the sections in or parallel to plane 28 along the top of the inlet are not symmetric about the horizontal line (alternatively a line 31 perpendicular to the inlet face plane and through the center point 33 on the leading edge radius forward-most line 29, separating the inlet section upper profile 35a and lower profile 35b see FIGS. 11A and 11B) In the preferred application the reduced sections covers a lateral distance J1 and J2 from each side of the vertical plane 28 through the engine shaft centerline of approximately 75% of the inlet half widths K1, K2 measured from the center vertical plane 28 to the outer most point 30a or 30b on the inner wall surface of the inlet leading edge curve 29. When measured at the inlet throat (the location of intake-air flow minimum cross-sectional area) location B aft of the section leading edge 29, the perpendicular distance from the horizontal line used to define the section thickness of the lower portion (C1) is greater than the thickness of the upper portion (C2) where C=C1+C2. The preferred ratio C2/C is between 0.25 and 0.40, and the most preferred ratio is between 0.30 and 0.35.

For a given lip offset distance S (FIG. 3B,C) from the engine, or spinner, centerline, and gap 26 region minimum surface fillet radius, Z, the reduced upper lip section thickness C allows the gap region, 26, to extend further aft, reference distance X for prior art (FIG. 3C), and distance Y for this invention shown in FIG. 3C. This allows more space for the low dynamic pressure, turbulent air flow exiting the spinner region to not converge with the air flow entering the inlet 4. The reference distance Y from the propeller spinner aft bulkhead reference plane for this invention is typically 20 to 30 percent longer that the distance X for prior art.

This reduction in thickness (D-C) of the ram-air inlet lip 7, results in less space available between the duct 8 outer surface 8a and internal surfaces 3a of the cowling 3, potentially resulting in excessive heating of those surfaces from their close proximity to the exhaust flow heated connection. To compensate for the reduced thickness of the inlet lip 4, exhaust gas flow transition connections 9a and 9b (FIG. 5) incorporating reduced thickness (reference F in FIG. 3B) connections are used; these allow for the provision for the cooling of, and insulation for, the adjacent cowling internal surface 3a and ram-air inlet duct 8 external surfaces 8b from the excessive heat associated with the hot exhaust gas connection. The transition connections 9a or 9b can be braised, welded or otherwise permanently attached to the inlet 4 partition bulkhead 4a or may be removably attached such as the bolted flange 9c shown in FIG. 9. Typically, to provide sufficient clearance, the height F of the transition connections 9a and 9b should be under 50% and preferably around 40% of the inlet 4 section thickness C (F/C=0.4). To maintain the necessary exhaust flow area, the lateral direction width of the transition connections 9a and 9b (reference G and G' FIG. 9B) are increased proportionally.

To achieve improved inlet duct ram-air pressure recovery, the inlet section has a reduced thickness C in the region of the exhaust flow connection of between 25% and 35%) and preferably between 26% and 28% of the height A of the inlet 4 opening (FIG. 3C) measured at the inlet throat, i.e., at the location a distance "B" in the duct from the forwardmost end of the duct lip 33. Alternatively, the inlet section reduced thickness C can be defined as a fraction of the distance H from the inlet face plane to the inlet throat wherein the preferred fraction ranges from 55% to 75% of the distance B with a preferred range of 60% to 70%.

As an example applying the invention to a single engine aircraft, shown in FIG. 2, such as the Pilatus® PC-12® or 21 model aircraft, using the first method, and referring to FIG. 3C, the inlet duct throat diameter, A, is approximately 6 inches and the inlet section reduced thickness C in the region of the exhaust flow transition connection is approximately 163 inches for a CIA ratio of 0.27. Alternatively, the inlet section reduced thickness C can be defined as a fraction of the distance B from the inlet face plane to the inlet throat, wherein the preferred fraction ranges from 60% to 75% of the distance B with a preferred range of 60% to 70%.

As an example of the invention applied to the Pilatus PC-12 or 21 model aircraft shown in FIG. 2, using the second method the distance B to the throat is approximately 2.5 inches.

Using a C/B ratio of 0.65, the reduced thickness C in the region of the exhaust flow transition connection would also be approximately 1.63. Using the preferred 40 ratio for F/C and a calculated inlet section reduced thickness C of 1.63, the reduced thickness of the transition section is 1.63*0.4=0.65 The exhaust supply tube connection diameter used for the Pilatus® PC-12® is 1.38, thus the thickness reduction ratio E/F for the connection transitions 9a and 9b is 1.38/0.65=2.12, which compares with the greater than 2 ratio typical of the thicker section inlet 5 shown in FIG. 3A. The flow area of the 1.38 diameter tube exhaust supply tube is approximately 1.5 in2 (ignoring the tube wall thickness), thus the width (G and G') of the transition connections 9a and 9b would need to be approximately 1.5/0.65=2.3 inches to provide equivalent flow area.

It should be noted that the temperature of the inlet can be varied by the amount of exhaust gases passing thro the inlet cavity 7, which, in turn is controlled by the diameter of the exhaust tubing connected to the inlet as well as the channel flow area of the transition connections 9a and 9b. Alternatively, a valve 41 (FIG. 4) could be inserted in tubes Ha or Hb to adjust the exhaust flow into or exiting the inlet cavity 7. This valve could be, e.g., a simple butterfly valve that can be, e.g., either thermostatically or manually controlled.

Figure 5:
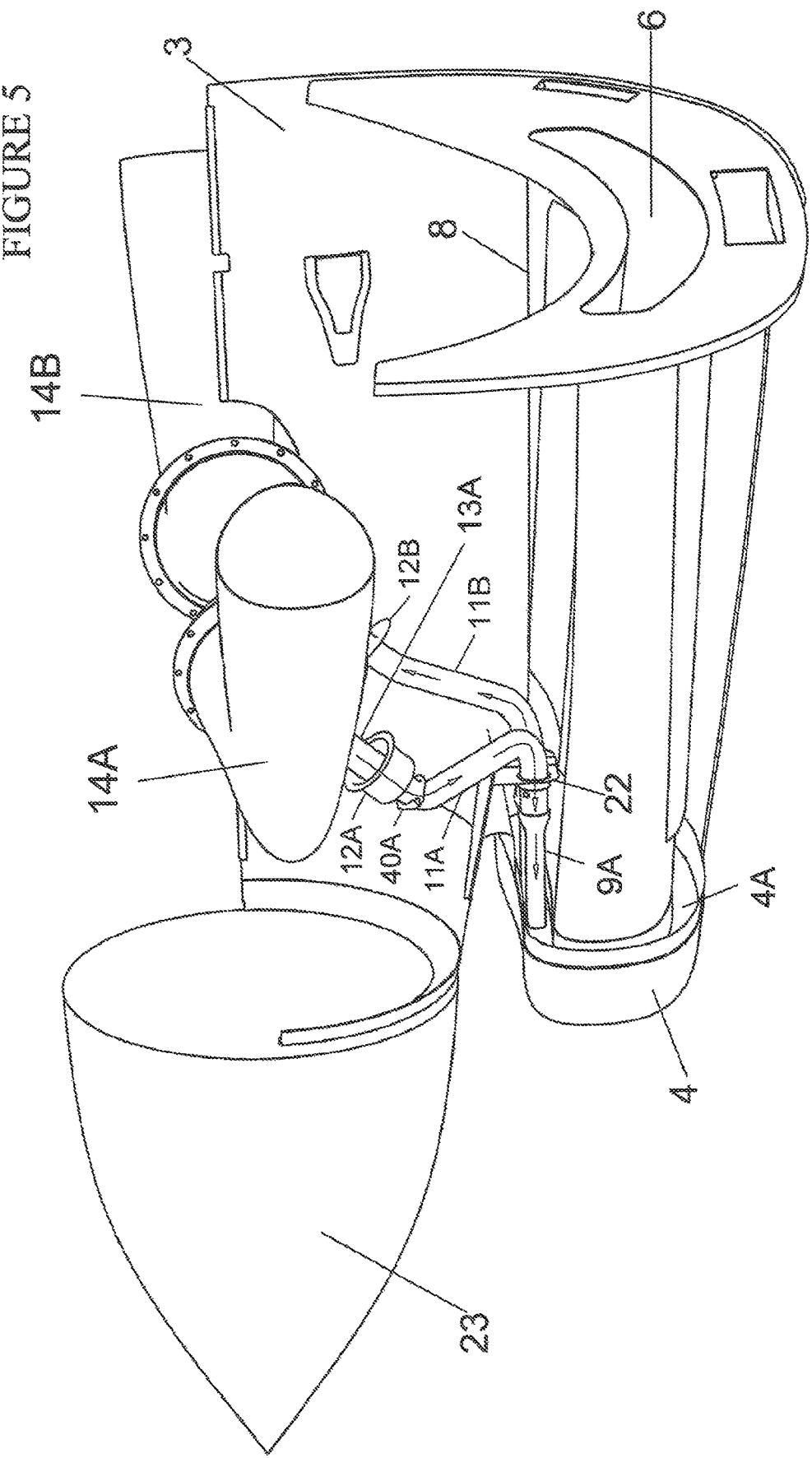
FIG. 5 is a side cross-sectional perspective view of a cut-away of the cowling in FIG. 2 showing the engine exhaust heating connections and components for the ram-air inlet design according to the invention.
Figure 14A:
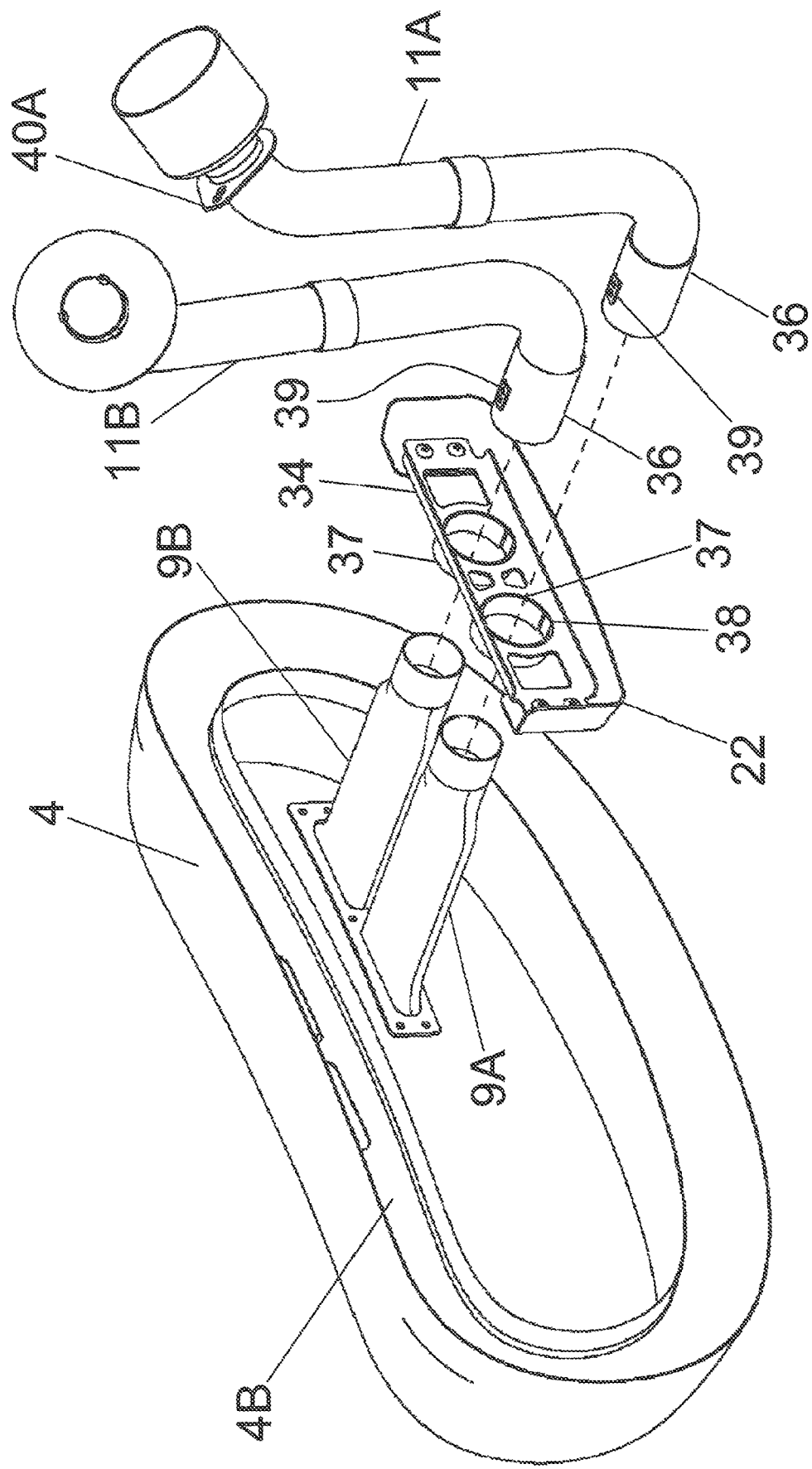
FIG. 14A is an exploded aft perspective view of the exhaust tube connections and support of FIG. 13.

In practice, due to the relatively short length of the transition connections 9a and 9b and the high exhaust temperatures, it has been found that a reduction in flow area in the connection transitions of up to 20% can be tolerated without significant impact of the inlet's anti-ice performance. Referring to FIGS. 5 and 9, e.g., for a single engine aircraft, such as the Pilatus PC-12 and 21 aircraft, the exhaust gases flow into the inlet lip 4 from the engine's left exhaust 14a, through transition connections 9a, then out transition connections 9b and into the engine's right exhaust 14b. Obviously a counter flow arrangement would provide a similar function. Also, because the inlet 4 is rigidly attached to the airframe cowling, the prior art has recognized that flexible connections 12a and 12b need to be placed between the connections at the engine's exhaust stacks 14a and 14b and the connections to inlets 4 and 5 (reference FIGS. 4 and 5). To stabilize the exhaust tube connections 11a and 11b to the transition connections 9a and 9b, FIGS. 5, 14A and 14B show a support bracket 22 connected to engagement bracket 34 which provide for the support of the exhaust tubes 11a and 11b at the transition connections 9a and 9b. The support bracket 22 is attached to either or both the outer surfaces of the duct 8a or inner surface 3a of the cowling 3.

FIG. 6 shows some additional details of the invention. Hot exhaust gases enter the transition connection 9a and flow into a cavity 7 within the ram-air inlet lip 4 formed by the bulkhead 4a attached to the inlet 4. A partition is inserted in the cavity 7 between the inlet and outlet transition connections, forcing the hot gases to circulate through the inlet cavity 7, around the inlet 4, and out the transition connection 9b.

Figure 10:
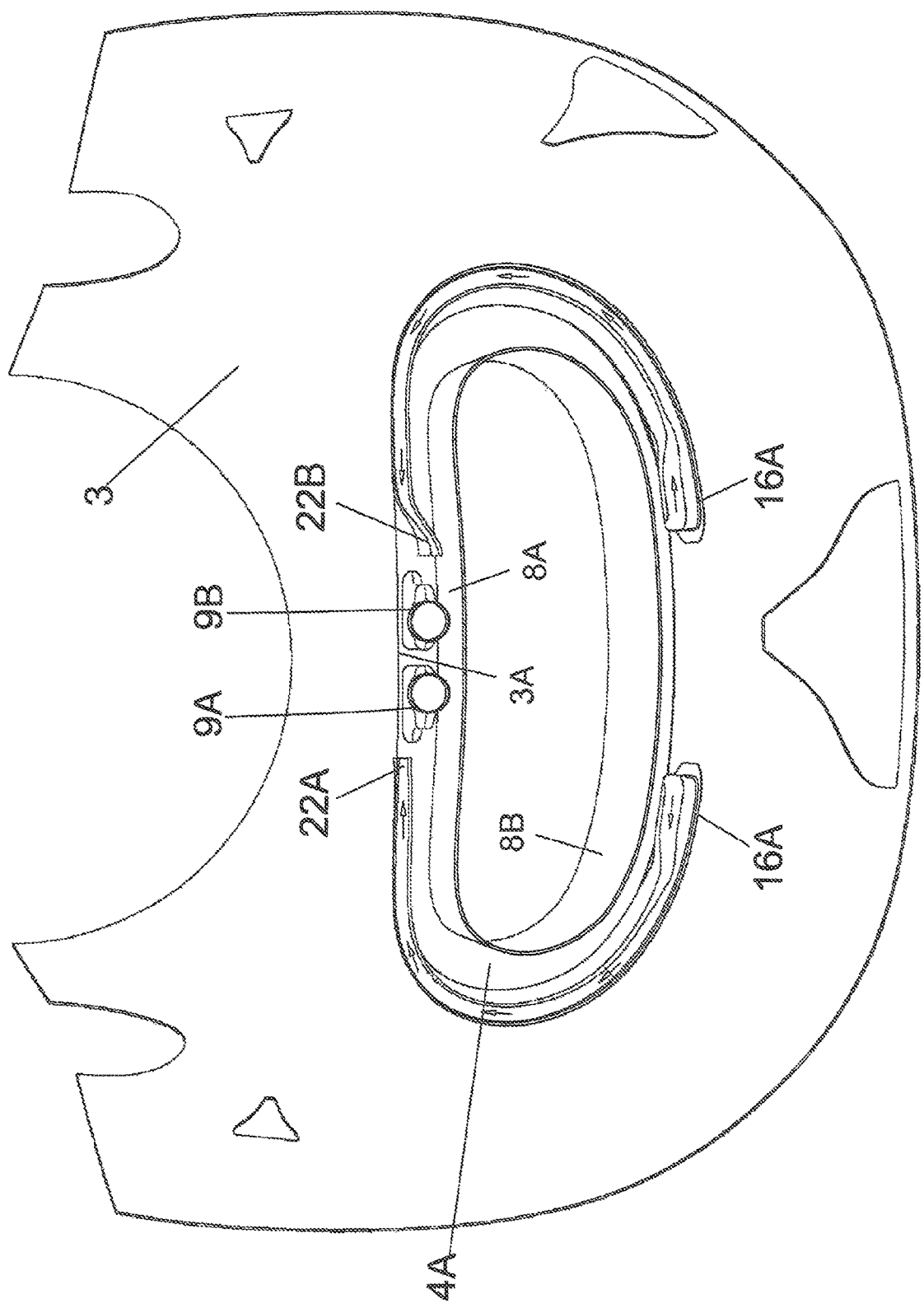
FIG. 10 is an aft view of the internal region of the cowling in FIG. 2 showing the circular to flattened, or ovoid, transition connection region with cooling air ducting.

Due to the intense heat of the exhaust gases, this invention provides additional means to protect the internal surfaces of the cowling 3, as well as the external surface Sa of the engine intake duct 8. As shown in FIGS. 6 and 10, external air flow entering the lower portion of the cowling, e.g., through inlet opening 20, is channeled through ducts 16a and 16b to provide cooling air flow between the connection transitions 9a and 9b and adjacent cowling 4 and duct 8 surfaces. In the preferred arrangement shown in FIG. 10, one of the external air flow cooling ducts 16a directs most of its cooling air flow out its exit 22a and onto the cowling 3 surface, and the other duct 16b directs most of its cooling air flow out its exit 22b and onto the engine intake duct 8 surface. Obviously, the arrangement of which duct cools which surface could be reversed or both ducts could be used to cool both surfaces. FIG. 11A shows a few NACA style flush inlets 17a,b and 20, used to supply the cooling air placed on the lower surface of the cowling. In practice, one or more flush inlets or inlets of alternate design could be used and placed at alternate locations on the cowling to feed air to one or more ducts channeling cooling air as required.

Figure 12:
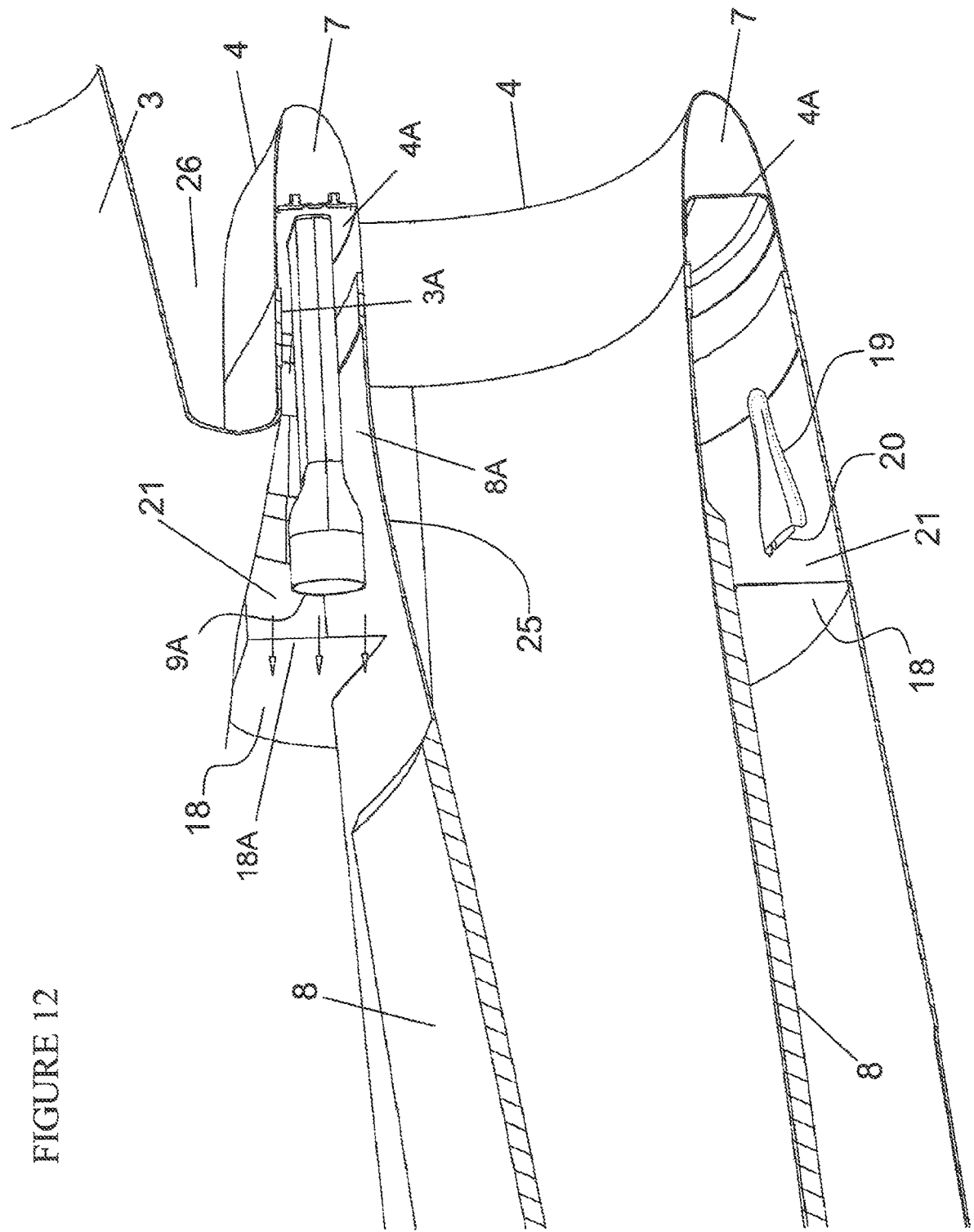
FIG. 12 is a side cross-sectional perspective view of a cut-away of the cowling in FIG. 2, taken along a centerline of the cowling, showing the addition of insulation materials and an alternate transition connection region cooling air design using a plenum chamber.
Figure 13:
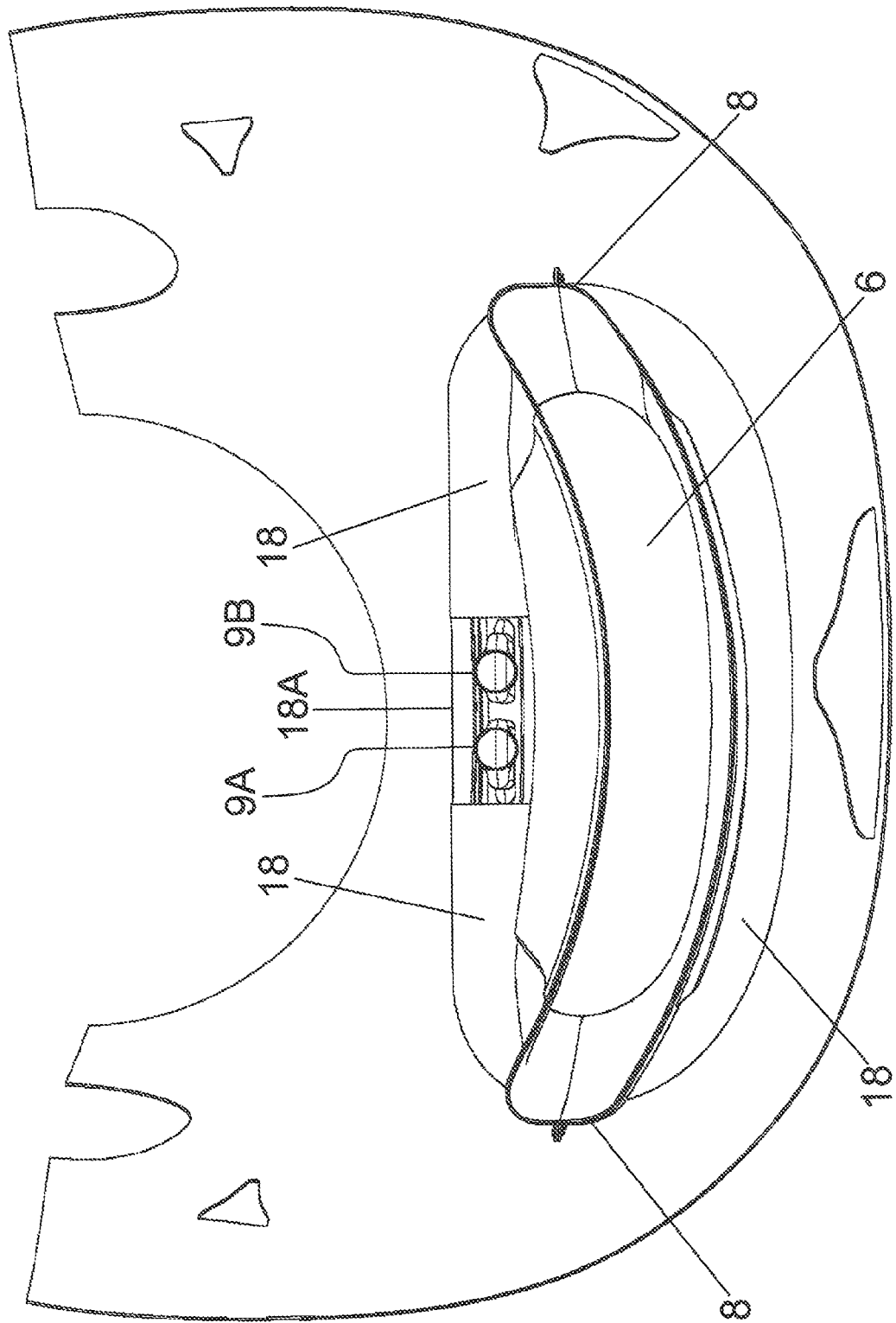
FIG. 13 is an aft view of the alternate transition connection region with cooling air design shown in FIG. 12.

An alternative cooling airflow arrangement is shown in FIGS. 12 and 13. In this configuration, a plenum chamber 21 is formed aft of the external air inlet 20 by insertion of a bulkhead partition 18. One or more external air inlets in the cowling provide airflow into the plenum chamber. The cooling air flow entering the plenum 21 exits through an opening 18a in the bulkhead partition 18 located in the region of the transition connections 9a and 9b thereby providing cooling airflow to the adjacent cowling 3 and duct 8 surfaces. Also shown in FIG. 12 is the application of thermal protection materials 25 to the adjacent cowling 3 and duct 8 surfaces. In addition, as shown in FIG. 7, a thermal barrier coating 27 may be applied directly to the surfaces of the transition connections 9a and 9b. Also, an external heat shield 11 placed around the transition connections 9a and 9b, such as that shown in FIG. 8, may be provided.

FIGS. 144 and 14B show the exhaust tube coupling connection means utilized for the invention. As shown in FIG. 5, the inlet duct lip 4 is attached to the cowling 3 and the support bracket 22 is attached to the upper surface of the intake duct 8. Referring to FIG. 14A, an engagement bracket 34 is rigidly attached to the support bracket 22. Sleeves 36 are attached to the ends of the exhaust tubes 11a and 11b and are inserted into the engagement cylinders 37 that are rigidly attached to the engagement bracket 34. As shown in FIG. 14B, once fully inserted, the sleeves 36 also insert over (or alternatively into) the round ends of the transition connections 9a and 9b. The sleeves 36 contain one or more protruding keys 39 attached to, or integrated with, the sleeve 36 that are inserted into and slide through slots 38 in the engagement cylinders 37 when the axis of the long straight section of the exhaust tubes 11a and 11b are placed approximately in the vertical position. Once fully inserted, the exhaust tubes are rotated (exhaust tube 11a is rotated counter clock wise looking forward, exhaust tube 11b is rotated clock wise looking forward) so that the sleeve keys 39 no longer align with the engagement cylinders slots 37 and 38, thus preventing the exhaust tube sleeves 36 from disengaging the coupling connection with the transition connection 9a and 9b. Brackets 40a and 40b secure the exhaust tubes rigidly to the cowling thereby preventing the exhaust tubes from rotating and subsequent separation of the coupling.

It should be noted that the turboprop compact inlet geometry described herein and illustrated in FIGS. 11A and 11B will also provide excellent ram-air recovery performance for inlets that do not incorporate engine exhaust flow heating deice (or anti-ice) means or alternate deice means such as electric heat element boots, or application of deicing liquid (TKS Systems).

Also, although the turboprop compact inlet geometry described herein is focused on aircraft tractor configurations wherein the propeller is positioned in front the inlet, the inlet geometry described herein is also applicable to aircraft pusher configurations wherein the propeller is located aft of the inlet.

The examples and descriptions given above illustrate possible embodiments of the present invention. While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments but should be defined only in accordance with the following claims and their equivalents.

The following invention is claimed:

1. An aerodynamic engine cowling for a turboprop engine for powering an aircraft comprising:
   a plurality of cowl openings through the aerodynamic engine cowling;
   the turboprop engine having a drive shaft powered by the turboprop engine and having an axis of rotation, the drive shaft extending outwardly beyond the aerodynamic engine cowling through a first cowl opening; and
   a plurality of propeller blades extending from a spinner, the spinner connected to a portion of the drive shaft extending outwardly beyond the aerodynamic engine cowling, so as to spin when the drive shaft rotates around their common axis of rotation;
   the aerodynamic engine cowling further comprising:
      an engine ram-air intake duct supported within the aerodynamic engine cowling, the engine ram-air intake duct extending between a first open end and a second open end, the first open end being connected to the turboprop engine to feed ram-air thereto and the second open end being in line with, and extending to, the aerodynamic engine cowling at a second cowl opening, the second cowl opening radially offset from the first cowl opening, and the second cowl opening and the second open end being generally oval in shape, a major axis of the second cowl opening and of the second open end extending perpendicular to the axis of rotation of the drive shaft;
      a ram-air intake duct inlet lip surrounding and extending forward from the second cowl opening, the ram-air intake duct inlet lip also connected to and in fluid flow connection with the second open end of the engine ram-air intake duct at the second cowl opening so as to be capable of directing a ram-air flow into the engine ram-air intake duct within the aerodynamic engine cowling;
      a required deicing ability being provided by connecting a back of the ram-air intake duct inlet lip to an exhaust of the turboprop engine via a pair of circular cross-section tubes to carry hot exhaust gases to and into, and out from, the ram-air intake duct inlet lip to prevent or eliminate icing;

a further improvement to the aerodynamic engine cowling resulting in improving the power output of the turboprop engine without loss of deicing ability comprising:

reducing a total radial height (C) and modifying the shape of a portion of the ram-air intake duct inlet lip closest to the spinner, and increasing a distance of that lip between the portion and the axis of rotation of the spinner by modifying the shape of the portion closest to the spinner such that the total radial height of the modified portion closest to the spinner is reduced to between 55% to 75% of a horizontal distance (B) parallel to the axis of rotation, the horizontal distance measured between an inlet face plane of the ram-air intake duct inlet lip to an inlet duct throat of the ram-air intake duct inlet lip; and a reference line passing through a leading edge point of the modified portion closest to the spinner, the reference line extending forwardly and rearwardly from the leading edge point of the modified portion closest to the spinner in a direction parallel to the axis of rotation of the spinner and drive shaft, the reference line forming a horizontal plane offset from and parallel to the axis of rotation of the spinner, the horizontal plane divides the total radial height (C) of the modified portion closest to the spinner into an upper portion height (C2) and a lower portion height (C1), the upper portion height (C2) defined between the horizontal plane and an exterior surface facing toward the spinner, the lower portion height (C1) defined between the horizontal plane and an exterior surface facing away from the spinner, the upper portion height (C2) is less than the lower portion height (C1); and a radial distance (S) between the axis of rotation of the spinner to the reference line is increased to a distance of between 1.2 to 1.5 times a maximum radius (R) of the spinner to increase an air gap region defined between the maximum radius (R) of the spinner and the exterior surface facing toward the spinner of the modified portion of the ram-air intake duct inlet lip to avoid the adverse effects of slow and turbulent airflow generated by the rotating spinner surface;

the improvement further comprises:

maintaining the required deicing ability sufficient to maintain the ram-air intake duct inlet lip free of ice, by providing a transition section between the circular cross-section tube from the exhaust of the turboprop engine to an interior of the ram-air intake duct inlet lip through a rear of the modified portion of the ram-air intake duct inlet lip, the transition section having the form of a circular to ovoidal transition connection between the interior of the modified portion of the ram-air intake duct lip and the circular cross-section tube from the exhaust of the turboprop engine, an ovoidal end of the circular to ovoidal transition connection having a height dimension (F) less than the total radial height (C) of the modified portion closest to the spinner, the height dimension (F) being between about 40% to about 50% of a diameter (E) of the circular cross-section tube, the ovoidal end of the circular to ovoidal transition connection having a width dimension (G) along a lateral length of the ram-air intake duct inlet lip, the width dimension (G) greater than the height dimension (F) such that a cross-sectional flow area of the ovoidal end is between 80% to 100% of the cross-sectional flow area of the circular cross-section tube; and whereby overheating of an interior of the aerodynamic engine cowling and the exterior of the pair of circular cross-section tubes by the exhaust gas is prevented by a plurality of cooling air openings through the aerodynamic engine cowling to provide cold outside air to the interior of the aerodynamic engine cowling and the exterior of the ram-air intake duct, thereby maintaining the deicing capacity of the system, while also preventing overheating of the interior of the aerodynamic engine cowling and the exterior of the ram-air intake duct by the exhaust gas.

2. The aerodynamic engine cowling for a turboprop engine, for powering an aircraft of claim 1 wherein the exhaust flow connections to the inlet transition connection are supported by a bracket attached to the outer surface of the engine air intake duct.

3. The aerodynamic engine cowling for a turboprop engine, for powering a multi-engine turboprop aircraft, each turboprop engine incorporating the aerodynamic engine cowling in accordance with claim 1.

4. The aerodynamic engine cowling in accordance with claim 1, wherein the upper portion height (C2) of the modified portion is between 25% and 40% of the total radial height (C) of the modified portion of the ram-air intake duct inlet lip.

5. The aerodynamic engine cowling in accordance with claim 4, wherein the upper portion height (C2) of the modified portion is between 30% and 35% of the total radial height (C) of the modified portion of the ram-air intake duct inlet lip measured in a plane at the location of the inlet duct throat.

6. The aerodynamic engine cowling for a turboprop engine, in accordance with claim 3, for powering a multi-engine turboprop aircraft, each engine incorporating the modified ram-air intake duct inlet lip, the modified ram-air intake duct inlet lip having a closed approximately oval profile relative to the front view of the aerodynamic engine cowling.

7. An aerodynamic engine cowling for a turboprop engine for powering an aircraft comprising:

a plurality of cowl openings through the aerodynamic engine cowling;

the turboprop engine having a drive shaft powered by the turboprop engine and having an axis of rotation, the drive shaft extending outwardly beyond the aerodynamic engine cowling through a first cowl opening; and a plurality of propeller blades extending from a spinner, the spinner connected to a portion of the drive shaft extending outwardly beyond the aerodynamic engine cowling, so as to spin when the drive shaft rotates around their common axis of rotation;

the aerodynamic engine cowling further comprising:

an engine ram-air intake duct supported within the aerodynamic engine cowling, the engine ram-air intake duct extending between a first open end and a second open end, the first open end being connected to the turboprop engine to feed ram-air thereto and the second open end being in line with, and extending to, the aerodynamic engine cowling at a second cowl opening, the second cowl opening radially offset from the first cowl opening, and the second cowl opening and the second open end being generally flattened ovoid or oval in shape, a major axis of the second cowl opening and the second open end second extending perpendicular to the axis of rotation of the drive shaft;

a ram-air intake duct inlet lip surrounding and extending forward from the second cowl opening, the ram-air intake duct inlet lip also connected to and in fluid flow connection with the second open end of the engine ram-air intake duct at the second cowl opening so as to be capable of directing a ram-air flow into the engine ram-air intake duct within the aerodynamic engine cowling;

a required deicing ability being provided by connecting a back of the ram-air intake duct inlet lip to an exhaust of the turboprop engine via a pair of circular cross-section tubes to carry hot exhaust gases to and into, and out from, the ram-air intake duct inlet lip to prevent or eliminate icing;

a further improvement to the aerodynamic engine cowling comprises modifying the ram-air intake duct inlet lip resulting directly in improving the efficiency of the ram air recovery, thus improving the power output of the turboprop engine without loss of deicing ability, the further improvement comprising:

reducing a total radial height (C) and modifying the shape of a portion of the ram-air intake duct inlet lip closest to the spinner, and increasing a distance between the portion and the axis of rotation of the spinner by modifying the shape of the portion closest to the spinner such that the total radial height of the modified portion closest to the spinner is reduced to between 60% to 75% of a horizontal distance (B) parallel to the axis of rotation, the horizontal distance measured between an inlet face plane of the ram-air intake duct inlet lip to an inlet duct throat of the ram-air intake duct inlet lip; and a reference line passing through a leading edge point of the modified portion closest to the spinner, the reference line extending forwardly and rearwardly from the leading edge point of the modified portion closest to the spinner in a direction parallel to the axis of rotation of the spinner and drive shaft, the reference line forming a horizontal plane offset from and parallel to the axis of rotation of the spinner, the horizontal plane divides the total radial height (C) of the modified portion closest to the spinner into an upper portion height (C2) and a lower portion height (C1), the upper portion height (C2) defined between the horizontal plane and an exterior surface facing toward the spinner, the lower portion height (C1) defined between the horizontal plane and an exterior surface facing away from the spinner, the upper portion height (C2) is less than the lower portion height (C1) such that a ratio of the upper portion height (C2) divided by the total radial height (C) is between 0.25 and 0.40; and a radial distance (S) between the axis of rotation of the spinner to the reference line is increased to a distance of between 1.2 to 1.5 times a maximum radius (R) of the spinner to increase an air gap region defined between the maximum radius (R) of the spinner and the exterior surface facing toward the spinner of the modified portion of the ram-air intake duct inlet lip to avoid the adverse effects of slow and turbulent airflow generated by the rotating spinner surface; the improvement further comprises maintaining the required deicing ability sufficient to maintain the ram-air intake duct inlet lip free of ice.

8. The aerodynamic engine cowling for a turboprop engine, for powering an aircraft, in accordance with claim 7, wherein the total radial height (C) of the modified portion of the ram-air intake duct inlet lip measured in a plane at the location of the inlet duct throat of the engine ram-air intake duct, is between 60% and 70% of the horizontal distance (B) parallel to the axis of rotation, the horizontal distance (B) measured between the inlet face plane and the plane at the location of the inlet duct throat.

9. The aerodynamic engine cowling for a turboprop engine, for powering an aircraft, in accordance with claim 7, further comprising an aft bulkhead reference plane perpendicular to the axis or rotation and located at the first cowl opening, wherein the reduction of the total radial height (C), of the modified portion closest to the spinner results in an increase of the radial distance (S) defined between the spinner axis of rotation and the reference line through the leading edge point (33) of the modified portion of the ram-air intake duct inlet lip, which in turn results in an increase of the air gap region defined between the maximum radius (R) of the spinner and the exterior surface facing toward the spinner of the modified portion of the ram-air intake duct inlet lip; an increased depth distance (Y) of the air gap region measured between the aft bulkhead reference plane and an inward-most point (44) of the air gap region at the outer surface of the aerodynamic engine cowling, the increased depth distance (Y) being about 20% to 30% longer than the prior art distance (X), the increase of the air gap region allowed more space for the low dynamic pressure and turbulent air flow exiting from the spinner to not converge with a higher pressure air flow from the plurality of propeller blades, the higher pressure air flow entering the second open end of the engine ram-air intake duct.

10. The aerodynamic engine cowling for a turboprop engine, for powering an aircraft, in accordance with claim 9, wherein the ratio of the upper portion height (C2) divided by the total radial height (C) is between 0.3 and 0.35.

11. An aerodynamic engine cowling for a turboprop engine for powering an aircraft comprising:

a plurality of cowl openings through the aerodynamic engine cowling;

the turboprop engine having a drive shaft powered by the turboprop engine and having an axis of rotation, the drive shaft extending outwardly beyond the aerodynamic engine cowling through a first cowl opening; and a plurality of propeller blades extending from a spinner, the spinner connected to a portion of the drive shaft extending outwardly beyond the aerodynamic engine cowling, so as to spin when the drive shaft rotates around their common axis of rotation;

the aerodynamic engine cowling further comprising:

an engine ram-air intake duct supported within the aerodynamic engine cowling, the engine ram-air intake duct extending between a first open end and a second open end, the first open end being connected to the turboprop engine to feed ram-air thereto and the second open end extending to the aerodynamic engine cowling at a second cowl opening, the second cowl opening radially offset from the first cowl opening, and the second cowl opening and the second open end being generally oval in shape, a major axis of the second cowl opening and of the second open end extending perpendicular to the axis of rotation of the drive shaft;

a ram-air intake duct inlet lip connected to the second opening at the second cowl opening so as to surround the second cowl opening and extend forward from the second cowl opening, the ram-air intake duct inlet lip also connected to and in fluid flow connection with the second opening into open end of the engine ram-air intake duct at the second cowl opening so as to be capable of directing a ram-air flow into the engine ram-air intake duct within the aerodynamic engine cowling;

a deicing ability being provided by connecting a back of the ram-air intake duct inlet lip to an exhaust of the turboprop engine via a pair of circular cross-section tubes to carry hot exhaust gases to and into, and out from, the ram-air intake duct inlet lip to prevent or eliminate icing;

a further improvement to the aerodynamic engine cowling resulting in improving the efficiency of ram air recovery, thus improving power output of the turboprop engine, this further improvement comprising:

reducing a total radial height (C) and modifying the shape of a portion of the ram-air intake duct inlet lip closest to the spinner, and increasing a distance between the portion and the axis of rotation of the spinner by modifying the shape of the portion closest to the spinner such that the total radial height (C) of the modified portion closest to the spinner is reduced to between 25% to 35% of a height (A) measured at an inlet duct throat of the ram-air intake duct inlet lip; and a reference line passing through a leading edge point (33) of the modified portion closest to the spinner, the reference line extending forwardly and rearwardly from the leading edge point of the modified portion closest to the spinner in a direction parallel to the axis of rotation of the spinner and drive shaft, the reference line forming a horizontal plane offset from and parallel to the axis of rotation of the spinner, the horizontal plane divides the total radial height (C) of the modified portion closest to the spinner into an upper portion height (C2) and a lower portion height (C1), the upper portion height (C2) defined between the horizontal plane and an exterior surface facing toward the spinner, the lower portion height (C1) defined between the horizontal plane and an exterior surface facing away from the spinner, the upper portion height (C2) is less than the lower portion height (C1) such that a ratio of the upper portion height (C2) divided by the total radial height (C) is between 0.30 and 0.35; and a radial distance (S) between the axis of rotation of the spinner to the reference line is increased to a distance of between 1.2 to 1.5 times a maximum radius (R) of the spinner to increase an air gap region defined between the maximum radius (R) of the spinner and the exterior surface facing toward the spinner of the modified portion of the ram-air intake duct inlet lip to avoid the effects of slow and turbulent airflow generated by the rotating spinner surface.

\* \* \* \* \*